Aug. 14, 1928.
R. C. DEALE ET AL
1,680,730
CONTROL SYSTEM
Filed April 12, 1924
5 Sheets-Sheet 2
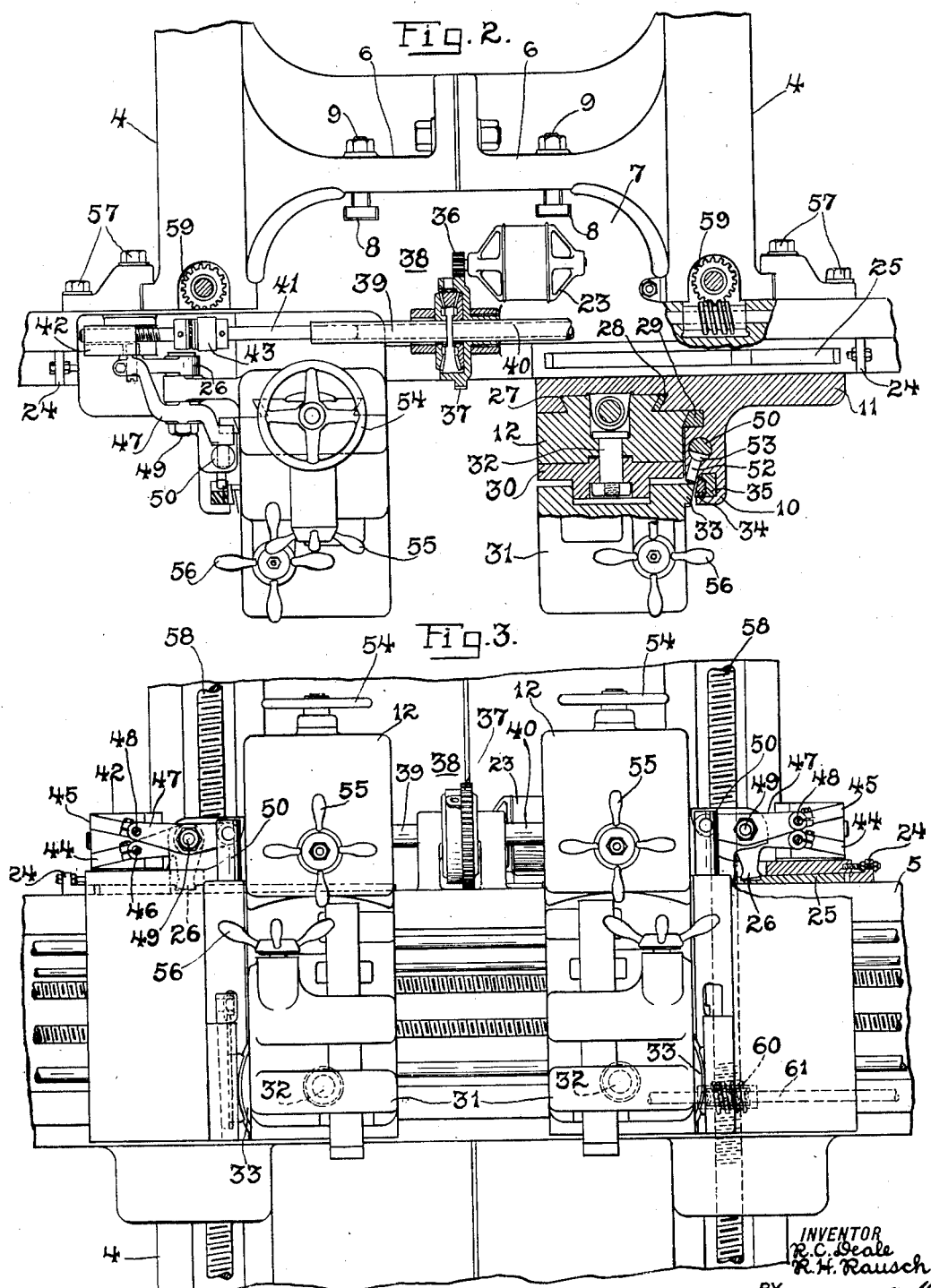
INVENTOR
R. C. Deale
R. H. Rausch
BY Wayne B Wells
ATTORNEY

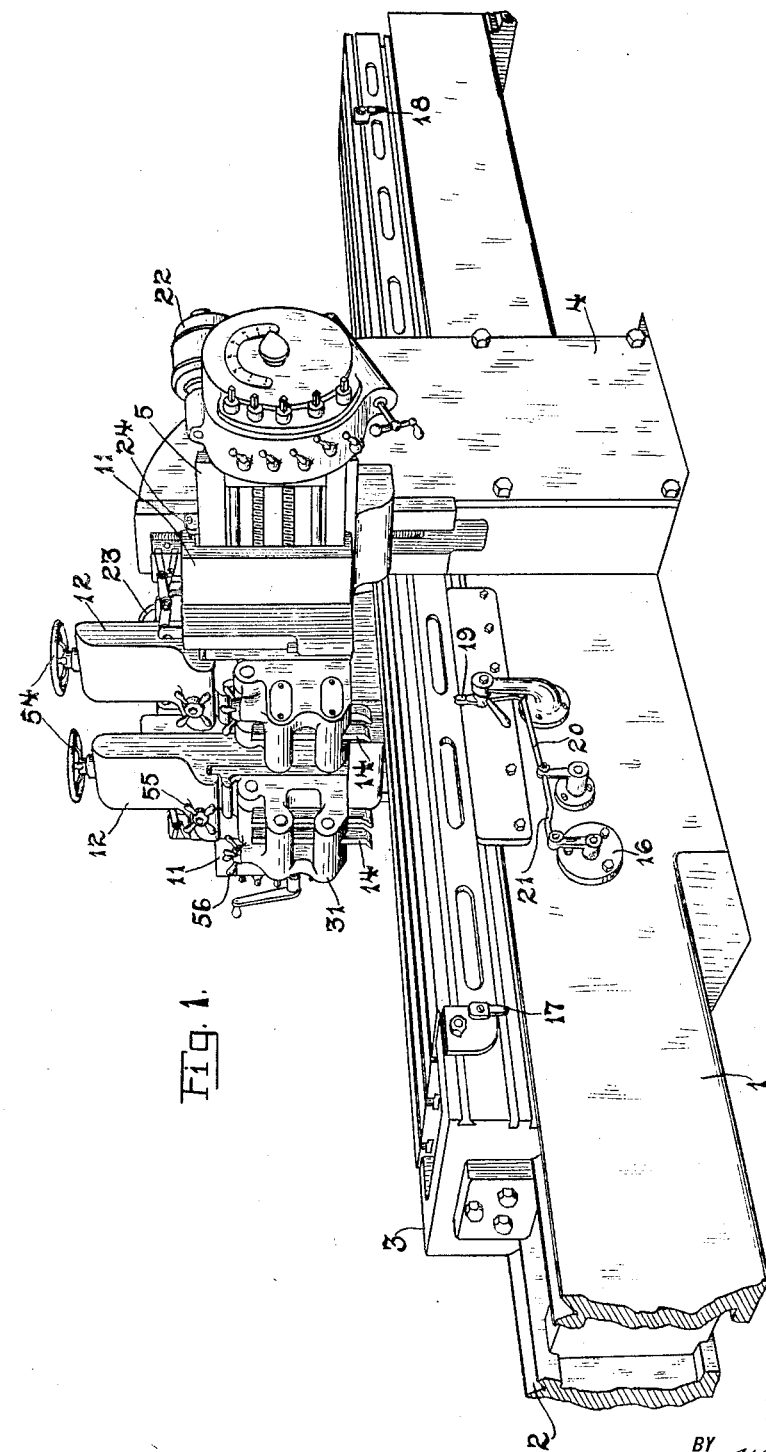

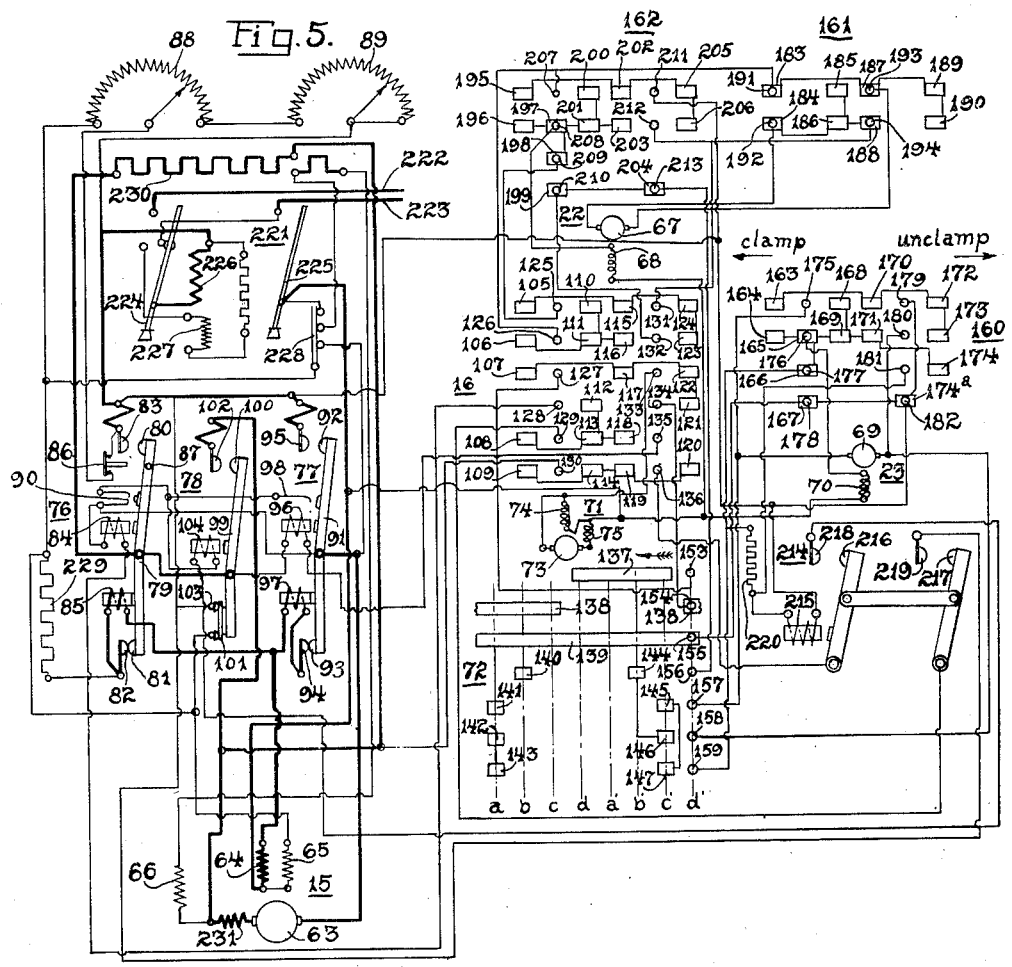
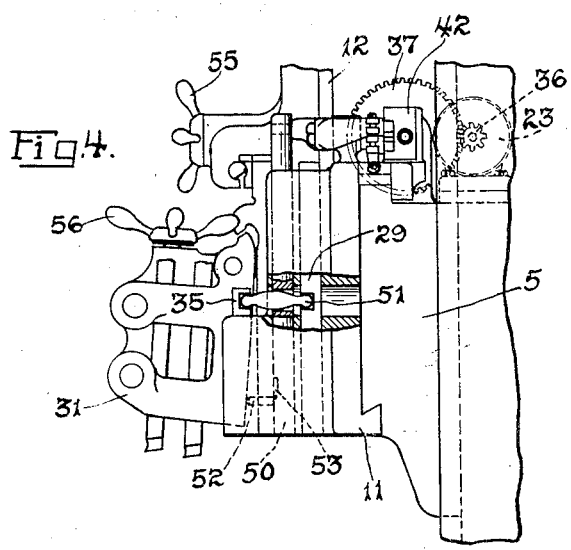

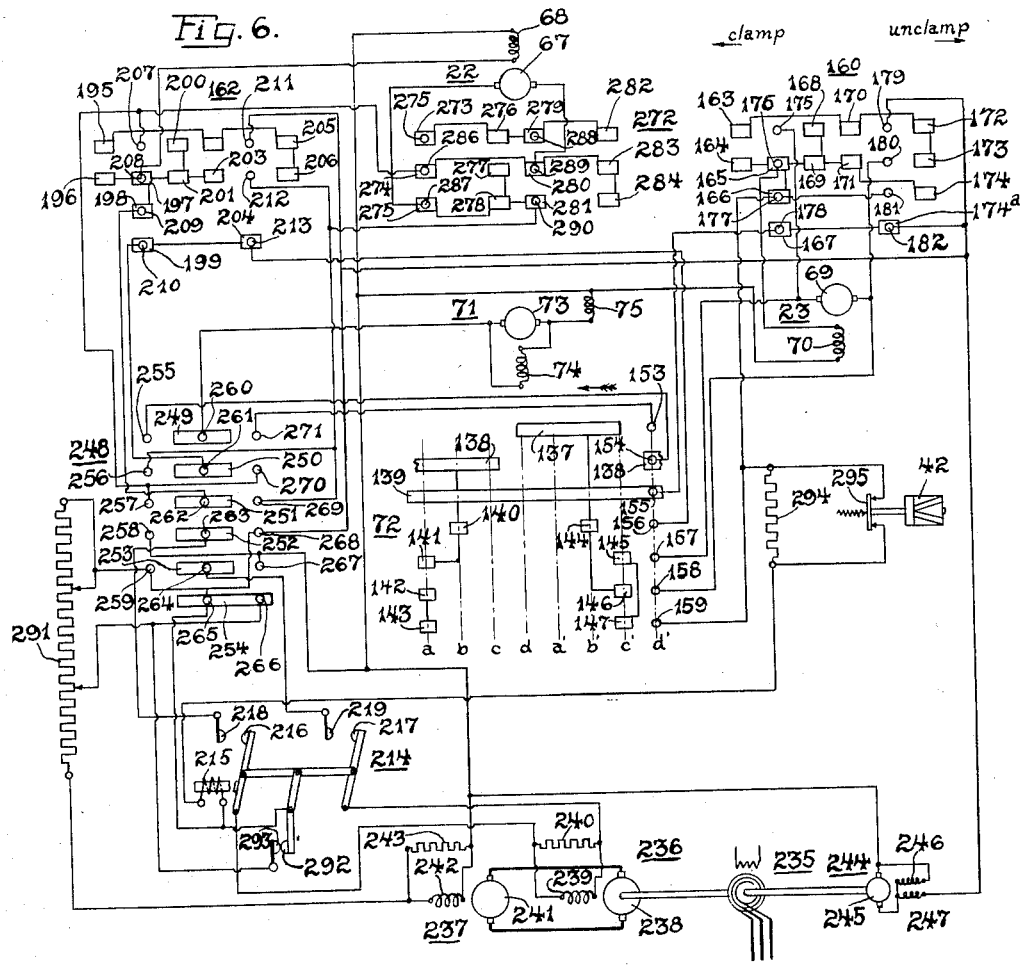

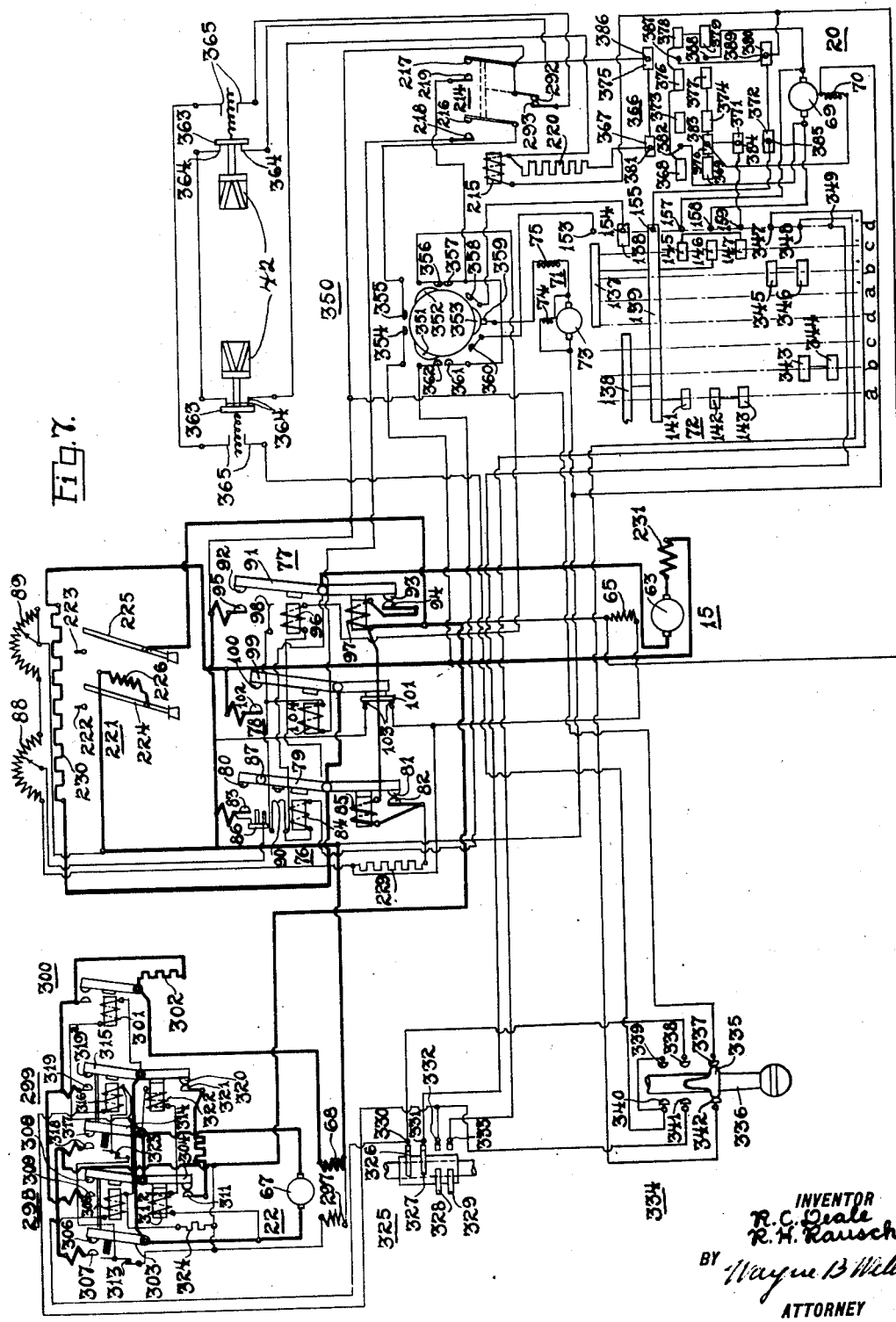

Patented Aug. 14, 1928.

1,680,730

UNITED STATES PATENT OFFICE.

ROBERT C. DEALE AND ROSWELL H. RAUSCH, OF PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed April 12, 1924. Serial No. 706,110.

Our invention relates to control systems for operating machine tools and particularly to control systems for operating planers.

One object of our invention is to provide a control system for a machine tool that shall automatically clamp the cutting tool in operative position after each feeding movement thereby and that shall automatically release the tool prior to each feeding movement.

Another object of our invention is to provide a control system of the above indicated character that shall automatically move the tool and the work out of operative relation at the end of the cutting stroke and that shall move the tool and the work into operative relation at the end of each return stroke.

Another object of our invention is to provide a control system, having a reciprocating table operated by a main motor and a feed motor for effecting feeding and traversing movements of the cutting tool, that shall control the main motor by a pilot switch in accordance with the table movement and that shall automatically operate a sequence switch by the pilot switch to control the feed motor and an auxiliary clamping motor.

A further object of our invention is to provide a control system of the above indicated character that shall operate the auxiliary motor for clamping and unclamping the tool and for moving it into and out of operative relation to the work table either automatically in accordance with the movement of the table or manually at will.

In the accompanying drawings:

Figure 1 is an isometric view of a planer adapted to be operated in accordance with our invention.

Fig. 2 is a plan view of the tool supporting means mounted in the cross rail of the planer shown in Fig. 1.

Fig. 3 is an elevational view of the tool supporting means shown in Fig. 2.

Fig. 4 is a side view of the parts shown in Fig. 3 partly broken away to more clearly show details of construction.

Fig. 5 is a diagrammatic view of a control system for operating a planer in accordance with our invention.

Fig. 6 is a diagrammatic view of a control system having a motor generator set for controlling the planer shown in Fig. 1.

Fig. 7 is a diagrammatic view of a pendent switch control system for governing the planer shown in Fig. 1.

In operating many machine tools, and particularly in operating a planer of the so-called "frog and switch" type, trouble is often experienced in holding the tool in set position and free from vibration. In a control system constructed in accordance with our invention, the cutting tool is securely clamped prior to each cutting operation by the machine so that a minimum of vibration is effected. Our invention has been illustrated by means of a planer of the frog and switch type having a reciprocating work carrying table 3 and one or more cutting tools 14 which are located on a cross rail 5 above the work carrying table 3. The work carrying table 3 is reciprocated in a well-known manner by means of a main motor 15 under the control of a pilot switch 16. A feed motor 22 is provided for effecting feeding and traversing movements by the cutting tool 14. A switch 161 is provided for controlling the direction of the feeding movements and another switch 162 is provided for controlling the traversing operation of the feed motor at will.

The pilot switch 16, which is operated by the work table 3, controls the operation of a sequence switch 72. The sequence switch 72 in turn not only automatically controls the feeding movements effected by the feed motor 22 but also automatically controls a clamp motor 23. The clamp motor 23 is rotated in one direction prior to the feeding movement to release the cutting tool 14 and is operated in a reverse direction after each feeding movement to securely clamp the cutting tool 14 in set position.

An auxiliary or clamp switch 160 is provided for controlling the operation of the clamp motor 23 at will and also for insuring against any automatic operation when the clamp switch is operated. The clamp switch 160 has three positions, namely, clamping, unclamping and the off position.

In the clamping position, the feed motor 22 and the clamp motor 23 are disconnected from the sequence switch 72 and can not be automatically operated at this time. In the unclamping position of the clamp switch 160, a relay is operated for permitting the operation of the feed motor 22 and the clamp motor 23 by the sequence switch 72. When the clamp motor 23 is moved to the off position, a holding circuit is established through the sequence switch 72 for holding the relay in operative position.

The clamp motor 23 is preferably mounted on the cross rail 5 and serves to clamp and unclamp the tool saddle 11 to the rail 5, to clamp and unclamp the tool slide 12 to the saddle 11, to clamp and unclamp the clapper member 31 to the slide 12, and also to move the clapper member 31 so as to separate the tool 14 from the work during the return stroke of the table 3. The clamping of the saddle 11, slide 12 and the clapper member 31 is effected at the end of the return stroke and after a feeding movement. The unclamping of the various members is effected at the end of the cutting stroke.

The frog and switch planer shown in this application is disclosed and claimed in the application of Clifford F. Randolph, Roswell H. Rausch and Nicholas Marcalus, Serial No. 675,203, filed November 16, 1923. The means disclosed in this application for securing the tools in the clapper members is disclosed and claimed in the application of Clifford F. Randolph and Nicholas Marcalus, Serial No. 670,535, filed October 24, 1923. The construction of the uprights and the means for supporting the cross rail shown in this application is disclosed and claimed in patent to R. H. Rausch and Nicholas Marcalus, No. 1,519,332, granted December 16, 1924. The feeding mechanism shown in this application is disclosed and claimed in patent to H. L. Blood, R. H. Rausch, C. W. Jensen and Harry Little, No. 1,560,653, granted November 10, 1925.

Referring to Figs. 1, 2, 3 and 4 of the drawings, a planer is shown comprising a bed 1, having ways 2 for supporting a reciprocating table 3 thereon. Uprights 4 are provided for supporting a cross rail 5 in any suitable manner. The uprights 4 have projecting portions 6 which are secured together by bolts. The projecting portions 6 serve as a brace for the rail 5, as shown in Fig. 2 of the drawings. A portion 7 of the rail projects rearwardly and has T-slots 8 formed therein. Bolts 9, which are secured to the portions 6 of the uprights 4, have heads fitted to the slots 8 in the cross rail. By means of the above structure, it is apparent the entire intermediate portion of the cross rail located above the table 3 is rigidly supported or braced in such manner as to insure against vibration during the cutting operation. Two saddles 11 are mounted on the cross rail 5 and each saddle in turn carries a tool slide 12. A block 30 is pivotally mounted on each slide 12 by means of a pin 32. A clapper member 31, which is pivotally mounted on each of the blocks 30, carries the cutting tools 14.

The table 3 of the planer is operated by means of a main motor 15. The main motor 15 is controlled by a pilot switch 16 in accordance with the movement of the reciprocating table 3. Two dogs 17 and 18, which are adjustably mounted on the table 3, engage a lever 19. The lever 19 is connected by links 20 and 21 to the pilot switch 16. Near the end of a cutting stroke by the table, the dog 17 engages the lever 19 for so operating the pilot switch 16 as to reverse the direction of rotation of the main motor. The table is returned to initial position. Near the end of the return stroke, the dog 18 engages the lever 19 for reversing the direction of rotation of the motor to start a cutting stroke by the planer. A feed motor 22 is provided for effecting feeding and traversing movements by the cutting tools in a manner to be hereinafter set forth. An auxiliary or clamp motor 23 is provided for clamping and unclamping the saddles 11 to the cross rail 5, for clamping and unclamping the slides 12 to the saddles 11, for clamping and unclamping the clapper members 13 to the saddles 11, for elevating the cutting tools 14 from the work carried by the table at the end of the cutting stroke, and for returning the tools into operative relation to the work at the end of the return stroke.

The two tool supporting means shown in the drawings are similar in construction and operation. Accordingly only one tool support and the parts connected thereto will be described in detail. The parts on the two tool supports have been designated by like reference characters. An adjusting gib 24 is provided for fitting the saddle 11 to the cross rail 5. A clamping gib 25, which is located in a slot formed in the adjusting gib 24, is provided for securely clamping the saddle to the cross rail after each feeding movement. The taper clamping gib 25 is operated by a bell crank lever 26 in a manner to be hereinafter set forth. The gib structure above mentioned is described and claimed in the patent to Nicholas Marcalus, No. 1,568,681, granted January 5, 1926.

The slide 12 is fitted to a guideway 27 in the saddle 11 by means of a taper gib 28. A second taper gib 29 is provided for securely holding the slide 12 against vibration in the saddle during a cutting operation. The clapper member 31 in the usual manner is pivotally mounted on the block 30 as indicated in Fig. 4 of the drawings. The outer edge of the clapper member 31 is provided with an integral projection 33, which tapers, as indicated in Fig. 2 of the drawings. This projection is arcuated about the pin 32 as a center. An arcuated clamping block 34 cooperates with the projection 33 and is slidably supported in a guideway formed in a taper gib 35. The gib 35 is slidably mounted in a projection 10 formed on the saddle 11 and serves to clamp the clapper member 31 in set position after each feeding movement.

The auxiliary motor 23 carries a pinion 36 which meshes with a gear wheel 37 of a differential gear mechanism 38. The differential gear mechanism may be of any standard construction and is connected to two shafts 39 and 40. The shafts 39 and 40 control the clamping of the two tool supports shown on the drawings. A shaft 41, which has telescopic connection with the shaft 39, is splined thereto and serves to operate a cam block 42. The cam block 42 is threadably connected to the shaft 41 and is moved in accordance with the rotation of the shaft 41 and the shaft 39. The shaft 41 is provided with a bearing 43 on the saddle 11 and a collar is disposed on each side of the bearing 43 to insure the shaft against any longitudinal movement with respect to the saddle. The auxiliary motor 23, the differential mechanism 38 and the shafts 39 and 40 are mounted on the rail 5. However, the telescopic connection between the shaft 39 and the shaft 41 permits free movement of the saddle 11 along the rail 5. It is to be understood, as heretofore set forth, that a cam block is provided for each tool support and that the cam blocks are similar in construction and operation.

Two cam grooves 44 and 45 are formed in the cam block 42 for controlling the various clamping operations. The bell crank lever 26, which controls the clamping gib 25, carries a pin 46 which is fitted to the cam groove 44. A second lever 47 carries a pin 48 which is fitted to the cam groove 45. The levers 26 and 47 are pivotally supported by a bolt 49 on the saddle 11. The lever 47 engages a rod 50 for clamping and unclamping the slide 12 to the saddle 11, for clamping and unclamping the clapper 31 to the saddle 11, for operating the clapper at the end of a cutting stroke to raise the tool from engagement with the work and for operating the clapper at the end of a return stroke to move the tool into operative relation to the work.

A cross bar 51 projects through a slot formed in the rod 50, as shown in Fig. 4 of the drawings. One end of the cross bar 51 engages the clamping gib 29 and the other end of the cross bar engages the clamping gib 35. Suitable notches are formed in the gibs 29 and 35 in order to receive the ends of the cross bar 51 and thus compel the clamping gibs to move in accordance with the movement of the rod 50. The connecting of the clamping gibs to the rod 50 by means of the cross bar 51 permits the equalizing of the force applied by the rod 50 to the clamping gibs. In this regard, is should be noted that the differential gear mechanism 38 serves to equalize the force supplied by the motor 23 for clamping the various parts of the two tool supports.

A pin 52, which is loosely supported in the projection 10 from the saddle 11, as shown in Figs. 2 and 4 of the drawings, serves to move the clapper member 31 in accordance with the movement of the rod 50. One end of the pin 52 engages the projecting portion 33 from the side of the clapper member, as shown in Fig. 2 of the drawings. The other end of the pin 52 is adapted, when the rod 50 is in its lower position, to enter a notch 53 formed in the rod 50. Thus, when the rod 50 is raised, the clapper member 31 is operated to elevate the cutting tools from the work on the table. In the lowered position of the rod 50, the pin 52 enters the notch 53 and permits the cutting tool to be lowered into operative position with respect to the work.

The cam blocks 42 are moved by the auxiliary motor 23 away from the center of the machine to unclamp the various parts of the tool supports and are moved towards the center of the machine to effect clamping of the various parts of the supports. The unclamping is effected just prior to each feeding movement and the clamping operation is effected immediately after each feeding movement. Movement of the cam block 42 away from the center of the machine serves to effect a movement of the bell crank lever 26 to loosen the clamping gib 25. Movement of the cam block 42 away from the center of the machine also serves to raise the rod 50. The rod 50, by means of the cross bar 51 loosens the two clamping gibs 35 and 29. The raising of the rod 50 also forces the pin 52 against the clapper member 31 to raise the cutting tools from the work. A rotation of the auxiliary motor in a reverse direction so operates the cam block 42 as to clamp the saddle to the rail, the slide to the saddle, and the clapper member to the saddle. Moreover, the cutting tool is lowered into operative position with respect to the work.

A hand wheel 54 is provided for operating the slide 12 on the saddle 11. A hand wheel 55 is provided for angularly adjusting the block 30 with respect to the slide 12 and a hand wheel 56 is provided for securing the cutting tools 14 in the clapper member 31. Inasmuch as the mechanical connections of the feed motor 22 for controlling the feeding and traversing operations is fully described and illustrated in the application of Clifford F. Randolph, Roswell H. Rausch and Nicholas Marcalus, Serial No. 675,203 filed November 16, 1923 above referred to, it is deemed unnecessary to describe such mechanism in detail in this application.

The bearing for the shaft 41 is elliptical in form as shown and described in the application Serial No. 675,203. It is necessary to provide an elliptical bearing in order to permit the shaft 41 and the block 42 to have a slight vertical floating motion. Such floating motion is necessary in order to equalize the forces applied to the levers 26 and 47. The rail 5 is clamped to the uprights 4 by suitable bolts 57. The rail is raised in any suitable manner by means of the screw shafts 58. The screw shafts 58 cooperate with suitable nuts 59 on the rail 5. The nuts 59 are operated in any suitable manner by means of the worms 60 on the shaft 61.

Referring to the system shown in Fig. 5 of the drawings, the main motor 15 comprises an armature 63, a series field-magnet winding 64, a shunt-field-magnet winding 65, a series emergency winding 66, and a compensating winding 231. The feed motor 22 comprises an armature 67, and a field-magnet winding 68. The clamp motor 23 comprises an armature 69 and a field-magnet winding 70. A pilot motor 71 is provided for operating a sequence switch 72. The pilot motor comprises an armature 73, a shunt field-magnet winding 74, and a series field-magnet winding 75.

The main motor 15 is controlled in a forward and in a reverse direction by means of two main switches 76 and 77, and an accelerating switch 78. The switches 76, 77 and 78 are controlled by the pilot switch 16 in accordance with the movement of the planer table 3. The pilot switch 16 not only serves to control the main and the accelerating switches but also controls the sequence switch 72.

The main switch 76 comprises a switch arm 79 having two contact members 80 and 81 mounted thereon. In the released position of the switch arm, the contact member 81 engages a stationary contact member 82 and in the operative position of the switch arm, the contact member 80 engages a stationary contact member 83. A magnet 84 is provided for operating the switch arm and a holding magnet 85 is provided for holding the switch arm in a released position under certain conditions. A switch 86, which is opened by a pin 87 on the switch arm 79 when the switch arm is in an operative position, serves to insert a resistor 89 in the circuit of the shunt field-magnet winding 65 during the return stroke of the planer table 3. A resistor 88 is included in the circuit of the winding 65 during the cutting and the return stroke of the planer. A switch 90 is closed by the switch arm 79 in the operative position for completing an energizing circuit for the accelerating switch 78.

The main switch 77 comprises a switch arm 91 having two contact members 92 and 93 mounted thereon. In the released position of the switch arm, the contact member 93 engages a stationary contact member 94 and in the operative position of the switch arm, the contact member 92 engages a stationary contact member 95. A main magnet 96 is provided for operating the switch arm and a holding magnet 97 is provided for holding the switch arm in the released position under certain conditions. A contact member 98 is engaged by the switch arm 91, in the operative position, in order to complete a circuit for operating the accelerating switch 78.

The accelerating switch 78 comprises a switch arm 99 having contact members 100 and 101 mounted thereon. In the operative position of the switch arm, the contact member 100 engages a stationary contact member 102. The contact member 101, which is insulated from the contact arm, bridges two contact members 103 in the released position of the switch arm. A magnet 104 is provided for operating the switch arm.

The pilot switch 16 comprises contact segments 105 to 124, inclusive, which are adapted to engage contact fingers 125 to 136, inclusive. The sequence switch 72, which is operated by the pilot motor 71 in accordance with the operation of the pilot switch 16, comprises contact segments 137 to 147, inclusive which are adapted to engage contact fingers 153 to 159, inclusive. A clamp switch 160 is provided for operating the clamp motor 23 at will. A feed switch 161 is provided for controlling the direction of the feeding movements and a traverse switch 162 is provided for controlling the traverse movements of the feed motor.

The clamp switch 160 comprises contact segments 163 to 174, inclusive, and the contact segment 174$^a$, which are adapted to engage contact fingers 175 to 182, inclusive. The clamping switch 160 has three positions, namely, a clamping position, an unclamping position and a neutral or off position. The switch is shown in the neutral or off position. The switch is moved towards the left for effecting a clamping operation and is moved towards the right, as shown in Fig. 5 of the drawings, for effecting an unclamping operation.

The feed switch 161 comprises contact segments 183 to 190, inclusive, which are adapted to engage contact fingers 191 to 194, inclusive. The traverse switch 162 comprises contact segments 195 to 206, inclusive, which are adapted to engage contact fingers 207 to 213, inclusive.

A relay 214 is provided for controlling the circuits passing through the sequence switch 72. The relay 214 comprises a coil 215 and contact members 216 and 217. The contact members 216 and 217 are respectively adapted to engage stationary contact members 218 and 219, when the relay is in an operative position. A resistor 220 is provided in a holding circuit for the relay 214.

A circuit breaker 221 of any suitable type is provided for connecting the control system to two supply conductors 222 and 223. The circuit breaker comprises two switch arms 224 and 225, an over-load winding 226, and a low voltage winding 227. A switch arm 228 is provided for bridging certain contact members upon release of the circuit breaker. The switch arm 228 serves to complete an emergency braking circuit. A choke resistor 229 is provided in the circuit of the shunt field-magnet winding 65 and a resistor 230 is provided in the circuit of the armature 63.

At the end of the cutting stroke, the dog 17 engages the lever 19 for so operating the pilot switch 16 as to effect operation of the main switch 76. The contact segments 110, 111, 112, 113 and 114 are moved to engage the contact fingers 125, 126, 128, 129 and 130. The contact segments 120 to 124, inclusive, are moved to engage the contact fingers 131, 132, 133, 134 and 136. The automatic operation of the system will first be described and it is assumed that the relay 214 is in an operative position.

A circuit is completed for operating the main switch 76. The circuit extends from the supply conductor 223 through the switch arm 225, series winding 64, holding coil 97, contact members 93 and 94, switch arm 91, magnet 84, contact fingers 128 and 129, which are bridged by the contact segments 112 and 113, contact members 217 and 219 of the relay 214, coil 226 and the switch arm 224 to the supply conductor 222. The main switch 76 is operated and a circuit is completed for so operating the main motor 15 as to effect a return stroke by the table 3. The circuit through the motor 15 extends from the supply conductor 223 through the switch arm 225, series winding 64, holding coil 97, contact members 93 and 94, switch arm 91, armature 63, coil 231, resistor 230, switch arm 79, contact members 80 and 83, coil 226, and the switch arm 224 to the supply conductor 222.

Upon operation of the main switch 76, an energizing circuit for the accelerating switch 78 is completed across the armature of the main motor. The energizing circuit for the accelerating switch extends from one terminal of the armature 63 through the switch 90, coil 104, contact members 218 and 216 of the relay 214, contact fingers 136 and 130, which are bridged by the contact segments 120 and 114, and the winding 231 to the other terminal of the armature 63. The accelerating switch 78 is operated for excluding the resistor 230 from the circuit of the main motor.

Prior to the operation of the accelerating switch 78, the circuit of the shunt field-magnet 65 extends from the supply conductor 223, through the switch arm 225, winding 65, contact members 103, which are bridged by the contact member 101, coil 226, and the switch arm 224 to the supply conductor 222. Thus, prior to the operation of the accelerating switch, the shunt field-magnet winding 65 is connected directly across the supply conductors 222 and 223. Upon operation of the accelerating switch 78, the circuit for the shunt field-magnet winding extends from the supply conductor 223 through the switch arm 225, winding 65, resistor 88, resistor 89, winding 226, and the switch arm 224 to the supply conductor 222. Thus, the two resistors 88 and 89 are included in the circuit of the shunt field-magnet winding 65 to increase the speed of the return stroke of the planer table.

The pilot switch also completes a circuit for operating the pilot motor 71. The circuit through the pilot motor 71 extends from the supply conductor 223 through the switch arm 225, winding 75, armature 73, contact fingers 133 and 134, which are bridged by the contact segments 122 and 121, contact fingers 154 and 155, which are bridged by contact segments 138 and 139, contact fingers 178 and 182, which are bridged by the contact segments 167 and 174$^a$, coil 226 and the switch arm 224 to the supply conductor 222. The pilot motor 71 is operated in a direction to move the sequence switch 72 towards the left as shown in Fig. 5 of the drawings. While the pilot switch is in the position above mentioned, the sequence switch is moved by the pilot motor from the off position to an unclamping position, a feeding position and two off positions.

In the unclamping position of the sequence switch which has been designated by the character $a$, the contact segments 141, 142 and 143 respectively engage the contact fingers 157, 158 and 159. In such position, a circuit is completed through the clamping motor 23 to effect the various unclamping operations heretofore described. The circuit through the motor 23 extends from the supply conductor 223 through the switch arm 225, winding 70, contact fingers 176 and 177, which are bridged by the contact segments 165 and 166, contact fingers 158 and 159, which are bridged by the contact segments 142 and 143, armature 69, contact fingers 157 and 155, which are bridged by the contact segments 141 and 139, contact fingers 178 and 182, which are bridged by the contact segments 167 and 174$^a$, coil 226 and the switch arm 224 to the supply conductor 222. The clamping motor 23 is operated to unclamp the saddles from the rail, to unclamp the tool slides from the saddles, to unclamp the clapper members from the saddles, and to so operate the clapper members as to raise the tools from the work carried by the table. Thus, during the return stroke of the table, the cutting tools are out of engagement with the work.

Upon movement of the sequence switch to the feed position, which is indicated by the reference characters $b$, the circuit through the clamp motor 23 is broken by the separation of the contact segments 141, 142 and 143 from the contact fingers 157, 158 and 159. In position $b$, the contact segment 140 engages the contact finger 156 and a circuit is completed for operating the feed motor 22. The circuit for the feed motor 22 extends from the supply conductor 223 through the switch arm 225, winding 68, contact fingers 208 and 209, which are bridged by the contact segments 197 and 198, contact fingers 125 and 126, which are bridged by the contact segments 110 and 111, contact fingers 191 and 193, which are bridged by the contact segments 183 and 187, armature 67, contact fingers 192 and 194, which are bridged by the contact segments 184 and 188, contact fingers 131 and 132, which are bridged by the contact segments 124 and 123, contact fingers 210 and 213, which are bridged by the contact segments 199 and 204, contact fingers 156 and 155, which are bridged by the contact segments 140 and 139, contact fingers 178 and 182, which are bridged by the contact segments 167 and 174$^a$, coil 226, and the contact arm 224 to the supply conductor 222. It will be noted that the various parts of the tool supports are unclamped during the feeding movement of the feed motor 22.

Upon movement of the sequence switch 72 from the position $b$ to the position $c$ which is an off position, the circuit of the feed motor is broken by separating the contact segments 140 from the contact finger 156. Upon movement of the sequence switch from position $c$ to position $d$, which is an off position, the circuit for the pilot motor 71 is opened. The circuit for the pilot motor 71 is opened by the contact segment 138 disengaging the contact finger 154. At this time, however, the contact finger 153 engages the contact segment 137 to effect operation of the pilot motor by the pilot switch 16 at the end of the return stroke.

At the end of the return stroke, the dog 18 engages the lever 19 to reverse the position of the pilot switch 16. In such position of the pilot switch, the contact segments 105, 106, 107, 108 and 109 are respectively moved into engagement with the contact fingers 125, 126, 127, 129 and 130 and the contact segments 115, 116, 117, 118 and 119 are respectively moved into engagement with the contact fingers 131, 132, 133, 135 and 136.

The energizing circuit for the magnet 84 of the main switch 76 is opened by separating the contact segment 112 from the contact finger 128. Upon release of the main switch 76, the accelerating switch 78 is released and a dynamic braking circuit is completed through the main motor 15. The dynamic braking circuit through the main motor extends from one terminal of the armature 63 through the switch arm 91, contact members 93 and 94, holding coils 97 and 85, contact members 82 and 81, switch arm 79, resistor 230, and the winding 231 to the other terminal of the armature 63. The dynamic braking circuit quickly stops the movement of the planer table and the holding coils 85 and 97 prevent operation of either the main switches until the dynamic braking circuit ceases to flow.

The pilot switch completes a circuit for operating the main switch 77. The circuit for operating the main switch 77 extends from the supply conductor 223 through switch arm 225, winding 64, coil 85, contact members 82 and 81, switch arm 79, coil 96, contact fingers 135 and 129, which are bridged by the contact segments 118 and 108, contact members 217 and 219, coil 226, and the switch arm 224 to the supply conductor 222. The main switch 77 is operated and a circuit is completed for operating the main motor in such direction as to effect a cutting stroke by the planer table. The circuit completed by the main switch 77 through the main motor extends from the supply conductor 223 through the switch arm 225, series field-magnet winding 64, holding coil 85, contact members 82 and 81, switch arm 79, resistor 230, coil 231, armature 63, switch arm 91, contact members 92 and 95, over-load coil 226, and the contact arm 224 to the supply conductor 222.

Upon operation of the main switch 77, an energizing circuit for the accelerating switch 78 is completed across the terminals of the armature 63. The energizing circuit for the accelerating switch extends from one terminal of the armature 63 through the switch arm 91, contact member 98, coil 104, contact members 218 and 216, contact members 136 and 130, which are bridged by the contact segments 119 and 109, and the coil 231 to the other terminal of the armature 63. The accelerating switch 78 is operated for excluding the resistor 230 from the circuit of the armature 63.

Prior to the operation of the accelerating switch 78, the shunt field-magnet winding 65 is connected directly across the supply conductors 222 and 223. However, upon operation of the accelerating switch 78, and the main switch 77, a circuit is completed for the shunt field-magnet winding 65 which extends from the supply conductor 223, through the switch arm 225, winding 65, resistor 88, switch 86, coil 226, and the switch arm 224 to the supply conductor 222. Thus, during the cutting stroke of the planer, the resistor 88 only is included in circuit with the shunt field-magnet winding. Accordingly, the cutting stroke is effected at reduced speed.

In such position of the pilot switch, a circuit is completed for operating the pilot motor 71. The energizing circuit for the pilot motor 71 extends from the supply conductor 223, through the switch arm 225, winding 75, armature 73, contact fingers 133 and 127, which are bridged by the contact segments 117 and 107, contact fingers 137 and 139, contact fingers 178 and 182, which are bridged by the contact segments 167 and 174ᵃ, coil 226, and the switch arm 224 to the supply conductor 222. The pilot motor is operated to move the sequence switch 72 to an off position, a feeding position, a clamping position, and another off position. The four positions have been respectively indicated by the reference characters $a'$, $b'$, $c'$ and $d'$.

In position $a'$ of the sequence switch, no change is made in the circuit of the feed motor or the clamp motor. In position $b'$ of the sequence switch, a circuit is completed through the feed motor 22. The circuit through the feed motor 22 is substantially the same as the circuit above traced in position $b$ of the sequence switch 72. In position $c'$ of the sequence switch, the contact segments 145, 146 and 147 respectively engage contact fingers 157, 158 and 159 for completing a circuit through the clamp motor 23. The circuit of the feed motor is interrupted by the separation of the contact segment 144 from the contact finger 156. In position $c'$, a circuit is completed through the clamp motor which extends from the supply conductor 223 through the switch arm 225, winding 70, contact fingers 176 and 177, which are bridged by the contact segments 165 and 166, contact fingers 159 and 157, which are bridged by the contact segments 147 and 145, armature 69, contact fingers 158 and 155, which are bridged by the contact segments 146 and 139, contact fingers 178 and 182, which are bridged by the contact segments 167 and 174ᵃ, winding 226, and the contact arm 224 to the supply conductor 222. The clamp motor is operated for clamping the saddles to the rails, for clamping the slides to the saddles, for clamping the clapper members to the saddles, and for so operating the clapper members as to move the cutting tool into operative relation with respect to the work carried by the planer table.

When the sequence switch is moved from the position $c'$ to the position $d'$ the circuit of the clamp motor 23 is interrupted by separating the contact segments 145, 146 and 147 from the contact fingers 157, 158 and 159, and the circuit of the pilot motor 71 is interrupted by separating the contact segment 137 from the contact finger 153. In such position of the sequence switch, it will be noted the contact finger 154 engages the contact segment 138 for completing a circuit through the pilot motor 71 when the pilot switch 16 is reversed at the end of the cutting stroke.

When the table 3 reaches the end of the cutting stroke, the dog 17 engages the lever 19 to again operate the pilot switch 16 and repeat the above cycle of operations. Upon movement of the pilot switch, the main switch 77 is released and a dynamic braking circuit is completed through the main motor. The braking circuit is similar to the circuit completed by the switch 76 at the end of the return stroke. If it is desired to change the direction of the feeding movements, the position of the feed switch 161 is reversed. The contact segments 183, 184, 187 and 188 are respectively separated from the contact fingers 191, 192, 193 and 194, and the contact segments 185, 186, 189 and 190 are respectively moved into engagement with the contact fingers 191, 192, 193 and 194.

The traverse switch 162 is shown in the off position in Fig. 5 of the drawings. Such switch is moved towards the right to effect a traverse movement in one direction and is moved towards the left to effect a traverse movement in the opposite direction. In the off position of the traverse switch, the contact segments 197, 198, 199 and 204 engage the contact fingers 208, 209, 210 and 213 to permit feeding movements by the feed motor 22 under the control of the sequence switch 72. However, when the traverse switch is moved to either of its operative positions, the contact segments 197, 198, 199 and 204 are separated from the contact fingers 208, 209, 210 and 213 to prevent any control of the feed motor by the sequence switch. In one operative position of the traverse switch, the contact segments 195 and 196 engage the contact fingers 207 and 208 and the contact segments 202 and 203 engage the contact fingers 211 and 212. In such position of the traverse switch, a circuit is completed through the feed motor which extends from the supply conductor 223 through the switch arm 225, winding 68, contact fingers 208 and 212, which are bridged by the contact segments 196 and 203, contact fingers 194 and 192, which are bridged by the contact segments 188 and 184, armature 67, contact fingers 193 and 191, which are bridged by the contact segments 187 and 183, contact fingers 207 and 211, which are bridged by the contact segments 195 and 202, coil 226, and the switch arm 224 to the supply conductor 222.

In the opposite position of the traverse switch 162, the contact segments 200 and 201 are moved into engagement with the contact fingers 207 and 208 and the contact segments 205 and 206 are moved into engagement with the contact fingers 211 and 212. In such position of the traverse switch, a circuit is completed from the supply conductor 223 through the switch arm 225, coil 68, contact fingers 208 and 207, which are bridged by the contact segments 201 and 200, contact fingers 191 and 193, which are bridged by the contact segments 183 and 187, armature 67, contact fingers 192 and 194, which are bridged by the contact segments 184 and 188, contact fingers 211 and 212, which are bridged by the contact segments 206 and 205, coil 226 and the switch arm 224 to the supply conductor 222.

The clamp switch 160 is shown in the off position in Fig. 5 of the drawings. Such switch is moved towards the left in order to effect a clamping operation of the motor 23 and is moved toward the right to effect an unclamping operation of the clamp motor 23. In the off position, as shown in Fig. 5 of the drawings, the contact segments 165, 166, 167 and 174ª respectively engage the contact fingers 176, 177, 178 and 182 in order to permit the automatic control of the clamp motor and the feed motor by the sequence switch 72. Upon movement of the switch towards the left in order to effect a clamping operation, the contact segments 168 and 169 engage the contact fingers 175 and 176, and the contact segments 172, 173 and 174 respectively engage the contact fingers 179, 180 and 181. A circuit is completed through the clamp motor which extends from the supply conductor 223 through the switch arm 225, coil 70, contact fingers 176 and 175, which are bridged by the contact segments 168 and 169, armature 69, contact fingers 179 and 180, which are bridged by the contact segments 172 and 173, coil 226, and the switch arm 224 to the supply conductor 222.

Upon movement of the clamp switch 160 towards the right, a circuit is completed through the clamp motor 23 for effecting an unclamping operation. The circuit extends from the supply conductor 223 through the switch arm 225, coil 70, contact fingers 176 and 180, which are bridged by the contact segments 162 and 171, armature 69, contact fingers 175 and 179, which are bridged by the contact segments 163 and 170, coil 226, and the switch arm 225 to the supply conductor 222. The clamp motor 23 is operated in such direction as to effect an unclamping operation.

In the clamping position of the clamp switch 160, a circuit is completed for operating the relay 214. The circuit through the coil of the relay extends from the supply conductor 223, through the switch arm 225, coil 70, contact fingers 176 and 181, which are bridged by contact segments 169 and 174, coil 215, coil 226, and the switch arm 224 to the supply conductor 222. Thus, in the clamping position of the switch 160, the coil 215 of the relay 214 is connected directly across the supply conductors 222 and 223. A holding circuit for the relay is established through the switch 160 in the off position. The holding circuit for the relay extends from the supply conductor 223 through the switch arm 225, coil 70, contact fingers 176 and 177, which are bridged by the contact segments 165, 166, resistor 220, coil 215, coil 226, and the switch arm 224 to the supply conductor 222. In the above operation of the clamp switch, it will be noted no automatic operation of the clamp motor or of the feed motor can be effected when the clamp switch 160 is in a clamping or in an unclamping position. Moreover, the relay 214, which controls the automatic operation of the clamp motor and the feed motor can only be operated when the switch 160 is moved to the clamped position. A holding circuit for the relay 214 is established when the clamp switch 160 is moved to the off position.

Referring to the system shown in Fig. 6 of the drawings, many of the parts shown in the figure are similar in construction and in operation to the control parts shown in the system disclosed in Fig. 5. Accordingly, like parts shown in Fig. 6 to those shown in Fig. 5 have been indicated by similar reference characters. The traverse switch, the clamp switch, the sequence switch, the feed motor, the pilot motor, and the clamp motor shown in Fig. 6 of the drawings are similar to the same parts shown in Fig. 5 and have been indicated by the same reference characters. The relay shown in Fig. 6 is in some respects similar to the relay shown in Fig. 5 and for that reason has been designated by the same reference characters.

A motor-genarator set comprising a motor 235 and a generator 236 is provided for operating a main motor 237. The main motor 237 corresponds to the main motor 15 shown in Fig. 5 of the drawings. The generator 236 comprises an armature 238 and a field-magnet winding 239. The winding 239 is protected by a resistor 240. The main motor 237 comprises an armature 241 and a field-magnet winding 242. The winding 242 is protected by a resistor 243. An exciter generator 244 is mechanically connected to the motor 235 and comprises an armature 245, a shunt field-magnet winding 246 and a series field-magnet winding 247. Although the motor 235 is shown as an alternating current motor, it is to be understood that a direct current motor may be provided if so desired.

A pilot switch 248 is provided for controlling the motor-generator set and the main motor in accordance with the movement of the reciprocating table 3. The pilot switch comprises contact segments 249 to 254, inclusive, which are adapted to engage contact fingers 255 to 271, inclusive. The pilot switch is moved towards the left, as shown in Fig. 6 of the drawings, upon engagement between the dog 17 and the lever 19 to effect a return movement of the planer table. At the end of the return stroke of the planer table, the dog 18 engages the lever 19 to move the pilot switch towards the right as shown in Fig. 6 of the drawings.

A feed switch 272 is provided for controlling the direction of rotation of the feed motor 22. The feed switch comprises contact segments 273 to 284, inclusive, which are adapted to engage contact fingers 285 to 290, inclusive. A resistor 291 is provided in the field circuit of the main motor 237. An auxiliary contact member 292, which is controlled by the relay 214, engages a stationary contact member 293 in the released position of the relay. The contact members 292 and 293 serve to short circuit the major portion of the resistor 291 when the relay 214 is in a released position. A holding resistor 294 is included in the energizing circuit for the coil 215 of the relay 214. A switch 295, which is controlled by the cam blocks 42, serves to short circuit the resistor 294 when a clamping operation is being effected. In the unclamped position of the planer, the switch 295 is open.

Assuming the relay 214 to be in an operative position and the planer table to be at the end of a cutting stroke, the pilot switch 248 is moved towards the left and the contact segments 249 to 253, inclusive, are moved into engagement with the contact fingers 255 to 259, inclusive. The field-magnet winding 239 of the generator 236 is energized by the exciter generator 244. The energizing circuit for the winding 239 extends from one terminal of the armature 245 through the series field-magnet winding 247, contact fingers 259 and 264, which are bridged by the contact segment 253, contact members 219 and 217, field-magnet winding 239, contact members 218 and 216, and contact fingers 258 and 263, which are bridged by the contact segment 252 to the other terminal of the armature 245.

A circuit is also completed for energizing the field-magnet winding 242 of the main motor 237. The circuit through the winding 242 extends from one terminal of the armature 245 through the field-magnet winding 247, contact fingers 268 and 259, resistor 291, and the winding 242 to the other terminal of the armature 245. It will be noted that a major portion of the resistor 291 is included in the circuit of the field-magnet winding 242 and accordingly the return movement of the planer is effected at an increased speed.

A circuit is completed for operating the pilot motor 71. The circuit extends from one terminal of the armature 245 through the series winding 247, contact fingers 178 and 182, which are bridged by the contact segment 167 and 174$^a$ contact fingers 155 and 154, which are bridged by the contact segments 139 and 138, contact fingers 255 and 260, which are bridged by the contact segment 249, armature 73, and the series winding 75, to the other terminal of the armature 245.

The sequence switch 72, which is operated by the pilot motor 71, is moved in the direction of the arrow to position $a$ which is an unclamping position. In position $a$ of the sequence switch, a circuit is completed through the clamp motor 23. The circuit extends from one terminal of the armature 245 through the series winding 247, contact fingers 182 and 178, which are bridged by the contact segments 167 and 174$^a$, contact fingers 155 and 157, which are bridged by the contact segments 139 and 141, armature 69, contact fingers 158 and 159, which are bridged by the contact segments 142 and 143, contact fingers 177 and 176, which are bridged by the contact segments 165 and 166, and the winding 70 to the other terminal of the armature 245. The motor 23 is operated to effect an unclamping operation prior to the operation of the feed motor 22.

The sequence switch is moved from position $a$ to position $b$ for effecting a feeding movement by the feed motor 22. A circuit is completed through the feed motor, which extends from one terminal of the armature 245 through the series winding 247, contact fingers 178 and 182, which are bridged by the contact segments 167 and 174$^a$, contact fingers 155 and 156, which are bridged by the contact segments 139 and 140, contact fingers 210 and 213, which are bridged by the contact segments 199 and 204, contact fingers 261 and 256, which are bridged by the contact segment 250, contact fingers 290 and 287, which are bridged by the contact segments 281 and 275, armature 67, contact fingers 289 and 286, which are bridged by the contact segments 280 and 274, contact fingers 257 and 262, which are bridged by the contact segment 251, contact fingers 209 and 208, which are bridged by the contact segments 198 and 197, and the series windings 68 to the other terminal of the armature 245. Prior to the feeding movement, the circuit of the clamp motor 23 is opened by separating the contact fingers 157, 158 and 159 from the contact segments 141, 142 and 143.

The sequence switch 72 is moved from position $b$ to positions $c$ and $d$ for opening the circuits of the feed motor 22 and the pilot motor 71. The circuit of the feed motor is opened by separating the contact segment 140 from the contact finger 156. The circuit of the pilot motor is opened by separating the contact segment 138 from the contact finger 154. In position $d$ of the sequence switch, the contact segment 137 is in engagement with the contact finger 153 so that in the reversed position of the pilot switch 248, a circuit is completed through the pilot motor 71.

At the end of the return stroke, the position of the pilot switch 248 is reversed and the contact segments 249 to 254, inclusive, are moved towards the right and into engagement with the contact fingers 266 to 271, inclusive. The separating of the contact segments 252 and 253 from the contact fingers 258 and 259 and the moving of such segments into engagement with the contact fingers 268 and 267 reverses the direction of current flow through the winding 239 of the generator 236. The reversing of the current flow through the winding 239 serves to reverse the direction of rotation of the main motor 237. The circuit completed through the winding 239 of the main motor extends from one terminal of the armature 245, through the series winding 247, contact fingers 263 and 268, which are bridged by the contact segment 252, contact members 218 and 216, field-magnet winding 239, contact members 217 and 219 and the contact fingers 264 and 267, which are bridged by the contact segment 253 to the other terminal of the armature 245.

A circuit is also completed for energizing the field-magnet winding 242 of the main motor 237. The circuit through the winding 242 extends from one terminal of the armature 245 through the field-magnet winding 247, contact fingers 265 and 266, which are bridged by the contact segments 254, a portion of the resistor 291 and the winding 242 to the other terminal of the armature 245.

The current flow through the field-magnet winding 239 of the generator is in such direction as to rotate the main motor 237 to effect a cutting stroke by the planer table 3. A portion of the resistor 291 is excluded from the circuit of the main motor field magnet winding 242 in order to reduce the speed of the main motor during the cutting operation.

The pilot switch 248 also completes a circuit for effecting operation of the pilot motor 71. The pilot motor 71 operates the sequence switch 72 in the direction indicated by the arrow. The circuit through the pilot motor extends from one terminal of the armature 245 through the series winding 247, contact fingers 182 and 178, which are bridged by the contact segments 167 and 174ª, contact fingers 155 and 153, which are bridged by the contact segments 139 and 137, contact fingers 260 and 271, which are bridged by the contact segment 249, armature 73, and the series winding 75 to the other terminal of the armature 245.

Upon operation of the pilot motor 71, the sequence switch 72 is moved from position $d$ through the positions $a'$ $b'$ and $c'$ to position $d'$. In position $a'$, no change is made in the circuits of the feed motor and the clamp motor. In position $b'$, a circuit is completed through the feed motor 22 to effect a feeding movement. The circuit through the feed motor in position $b'$ of the sequence switch is similar to the circuit traced through the feed motor in position $b$ of the sequence switch. In position $c'$ of the sequence switch, a circuit is completed through the clamp motor 23 to effect a clamping operation. The circuit through the clamp motor 23 with the sequence switch in position $c'$ extends from one terminal of the armature 245 through the series winding 247, contact fingers 178 and 182, which are bridged by the contact segments 167 and 174ª, contact fingers 155 and 158, which are bridged by the contact segments 139 and 146, armature 69, contact fingers 157 and 159, which are bridged by contact segments 145 and 147, contact fingers 177 and 176, which are bridged by the contact segments 166 and 165, and the series winding 70 to the other terminal of the armature 245. In position $d'$, which is an off position, the contact segment 137 is separated from the contact finger 153 for opening the circuit of the pilot motor 71. However, in position $d'$, the contact segment 138 is moved into engagement with the contact finger 154 to complete a circuit through the pilot motor when the position of the pilot switch 248 is reversed.

The traverse switch 162, the feed switch 272, and the clamp switch 160, shown in Fig. 6 of the drawings, are similar in operation to like switches shown in Fig. 5 of the drawings. Accordingly, it is deemed unnecessary to trace the circuits formed through such switches when they are moved through their various positions. The coil 215 of the relay 214 is energized by a circuit which extends from one terminal of the armature 245 through the series winding 247, contact fingers 266 and 265, winding 215, switch 295, contact fingers 177 and 176, which are bridged by the contact segments 166 and 165, and the series winding 70 to the other terminal of the armature 245. Inasmuch as the switch 295 is only closed when the cam block 42 is in a clamping position, it is evident the relay 214 can only be operated during the clamping operation. However, the resistor 294 which is connected around the switch 295 permits a sufficient current to flow therethrough for holding the relay 214 in an operative position.

Referring to Fig. 7 of the drawings, a control system very similar to the system shown in Fig. 5 is shown wherein a pendent switch is provided for controlling the traverse movements of the feed motor. In the system shown in Fig. 7, the main motor 15 and the various switches for controlling it are similar in construction and operation to the main motor 15 and the switches 76, 77 and 78 shown in Fig. 5. Accordingly, the same reference characters have been used in Figs. 5 and 7 of the drawings to designate the main motor and the controlling switches. A circuit breaker is provided which is similar in construction to the circuit breaker shown in Fig. 5. Accordingly the same reference characters have been used to designate the circuit breakers shown in Figs. 5 and 7. The pilot motor, the clamp motor, and the sequence switch have been indicated in Fig. 7 by the same reference characters as used in designating the same parts in Fig. 5 of the drawings.

The feed motor 22, shown in Fig. 7, is provided with an additional shunt field-magnet winding 297 and is controlled by two feed switches 298 and 299 and an accelerating switch 300. The accelerating switch 300 is operated by a magnet 301 and serves to short circuit a resistor 302. The magnet 301 is connected across the armature 67 of the feed motor in order to be operated in accordance with the counter-electromotive force developed.

The feed switch 298 comprises an operating magnet 305 and two switch arms 303 and 304 which are mechanically connected together. The switch arm 303 carries a contact member 306 which is adapted to engage a stationary contact member 307 in the operative position of the switch. The switch arm 304 carries two contact members 308 and 310. The contact member 308 is adapted to engage a stationary contact member 309 in the operative position of the switch and the contact member 310 is adapted to engage a stationary contact member 311 in the released position of the switch. A holding coil 312 is provided for preventing operation of the switch 298 when a dynamic braking current is flowing through the feed motor. An auxiliary switch 313 is operated by the switch arm 303.

The switch 299 comprises two switch arms 314 and 315 which are operated by a magnet 316. The switch arm 314 carries a contact member 317 which is adapted to engage a stationary contact member 318 in the operative position of the switch. The switch arm 315 carries two contact members 319ᵃ and 320. The contact member 319ᵃ is adapted to engage a contact member 319 in the operative position of the switch, and the contact member 320 is adapted to engage a stationary contact member 321 in the released position of the switch. A holding coil 322 is provided for preventing operation of the switch when a dynamic braking current is flowing through the feed motor. An auxiliary switch 323 is operated by the switch arm 314. The auxiliary switches 313 and 323 serve to prevent simultaneous operation of the two switches 298 and 299. A holding resistor 324 is provided in the circuit of the magnet 305 and the magnet 316.

A limit switch 325 is provided for controlling the feeding movements. The limit switch comprises contact segments 326 to 329, inclusive, which are adapted to engage contact fingers 330 to 333, inclusive. A pendent switch 334 is provided for controlling the traverse movements of the feed motor. The pendent switch comprises a contact segment 335, which is mounted on a rod 336, and contact fingers 337 to 342, inclusive.

The sequence switch 72 is provided with four contact segments 343 to 346, inclusive, which control the feeding movements. The contact segments 343 to 346, inclusive, are used in place of the contact segments 140 and 144 shown in Fig. 5. The contact segments 343 to 346, inclusive, are adapted to engage contact fingers 347, 348 and 349. A pilot switch 350 is provided for controlling the operation of the system in accordance with the movements of the planer table 3. The pilot switch 350 comprises contact segments 351, 352 and 353 which are adapted to engage contact fingers 354 to 362, inclusive. The cam blocks 42 are adapted to control switch members 363. In the clamped position shown in Fig. 7 of the drawings, the contact members 363 bridge contact fingers 364. In the unclamped position, the contact members 363 are adapted to bridge contact fingers 365. A clamp switch 366 is provided for controlling the operation of the clamp motor 23 at will. The clamp switch comprises contact segments 367 to 380, inclusive, which are adapted to engage contact fingers 381 to 389, inclusive.

The circuits through the main motor 15, the main switches 76 and 77, and the accelerating switch 78 are similar to the circuits traced in describing the system shown in Fig. 5. Accordingly, no extended description of such circuits will be given in describing Fig. 7. The main switch 76 is operated to effect a return stroke by the table 3 when the pilot switch 350 is moved to bridge the contact fingers 361 and 362 by the contact segment 351. At such time, the contact segment 352 bridges the contact fingers 354 and 355 for operating the accelerating switch 78. At the end of the return stroke, the pilot switch operates the contact segment 352 to bridge the contact fingers 356 and 357. The main magnet 77 is operated to effect a cutting stroke by the table 3. At the beginning of the return stroke, the accelerating switch 78 is operated by a circuit which is completed through the contact fingers 354 and 355 and the contact segment 351.

Assuming the relay 214 to be in an operative position and the pilot switch 350 to be moved into position for effecting a return stroke of the table, a circuit is completed for operating the pilot motor 71. The circuit through the pilot motor extends from the supply conductor 223 through the switch arm 225, contact fingers 389 and 385, which are bridged by the contact segments 372 and 380, contact fingers 155 and 154, which are bridged by the contact segments 139 and 138, contact fingers 358 and 359, which are bridged by the contact segment 353, series winding 75, armature 73, coil 226, and the switch arm 224, to the supply conductor 222. The pilot motor 71 is operated for moving the pilot switch 72 through positions $a$, $b$, and $c$, to position $d$, which is an off position. In position $a$ of the sequence switch, a circuit is completed for operating the clamp motor 23. The motor 23 is operated in such direction as to effect an unclamping operation. The circuit through the clamp motor extends from the supply conductor 223 through the switch arm 225, contact fingers 389 and 385, which are bridged by the contact segments 372 and 380, contact fingers 155 and 157, which are bridged by the contact segments 139 and 141, armature 69, contact fingers 158 and 159, which are bridged by the contact segments 142 and 143, contact fingers 384 and 383, which are bridged by the contact segments 370 and 371, coil 70, coil 226, and the switch arm 224 to the supply conductor 222.

In position $b$ of the sequence switch, a circuit is completed for operating the feed switch 298. The circuit through the feed switch extends from the supply conductor 223 through the switch arm 225, switches 313 and 323, magnet 305, contact fingers 330 and 331, which are bridged by the contact segments 326 and 327, contact fingers 349 and 348, which are bridged by the contact segments 344 and 343, contact fingers 342 and 337, which are bridged by the contact segment 335, coil 226, and the switch arm 224 to the supply conductor 222. The switch 298 is operated and a circuit is completed through the feed motor 22. The circuit through the feed motor extends from the supply conductor 223 through the switch arm 225, contact fingers 307 and 306, switch arm 303, armature 67, switch arm 304, contact members 308 and 309, resistor 302, series winding 68, coil 226, and the switch arm 224 to the supply conductor 222. Thereupon the accelerating switch 300 is operated for short circuiting the resistor 302. In moving the sequence switch from position $a$ to position $b$, the circuit for the clamp motor 23 is opened by separating the contact segments 141, 142 and 143 from the contact fingers 156, 157 and 158. The feeding movement is limited by the limit switch 325 which opens the circuit of the feed switch prior to the opening of such circuit by the sequence switch 72. Upon moving the sequence switch 72 from position $b$ to positions $c$ and $d$, the circuit of the pilot motor 71 is opened by separating the contact segment 138 from the contact finger 154.

At the end of the return stroke, the pilot switch is operated for again completing a circuit through the pilot motor 71. The circuit through the pilot motor is completed by the contact segment 353 bridging the contact fingers 359 and 360. In position $a'$ of the sequence switch, no change is made in the circuits of the feed motor and the clamp motor. In position $b'$ of the sequence switch, a circuit is completed for operating the feed switch 299. The circuit through the coil of the feed switch 299 extends from the supply conductor 223 through the switch arm 225, switches 313 and 323, coil 316, contact fingers 332 and 333, which are bridged by the contact segments 328 and 329, contact fingers 347 and 348, which are bridged by the contact segments 345 and 346, contact fingers 342 and 337, which are bridged by the contact segment 335, coil 226, and the switch arm 224 to the supply conductor 222. The energizing circuit for the feed switch 299 is opened by the limit switch 325.

In position $c'$ of the sequence switch, a circuit is completed for effecting a clamping operation by the clamp motor 23. The circuit through the clamp motor extends from the supply conductor 223 through the switch arm 225, contact fingers 389 and 385, which are bridged by the contact segments 372 and 380, contact fingers 155 and 158, which are bridged by the contact segments 139 and 146, armature 69, contact fingers 157 and 159, which are bridged by the contact segments 145 and 147, contact fingers 384 and 383, which are bridged by the contact segments 371 and 370, series winding 70, coil 226 and the switch arm 224 to the supply conductor 222. In position $d'$ of the sequence switch, the circuit of the pilot motor 71 is opened by separating the contact segment 137 from the contact finger 153 and the circuit of the clamp motor 23 is opened by separating the contact segments 145, 146 and 147 from the contact fingers 157, 158 and 159.

The feed switches 298 and 299 may be controlled by the pendent switch 334 independent of the sequence switch 72 and the limit switch 325. The rod 336 is moved upwardly to separate the contact segment 335 from the contact fingers 342 and 337. The separating of the contact segment from the contact fingers insures against any automatic control of the feed switches. The feed switch 298 is opened by moving the contact segment 335 to bridge the contact fingers 339 and 338 and the feed switch 299 is operated by moving the contact switch 335 to bridge the contact segments 340 and 341. The energizing circuit through the feed switch 298 extends from the supply conductor 223, switch arm 225, switches 313 and 323, coil 305, contact fingers 338 and 339, which are bridged by the contact segment 335, contact fingers 365, which are bridged by the contact members 363, contact members 292 and 293, coil 226, and the switch arm 224 to the supply conductor 222. The energizing circuit for the feed switch 299 extends from the supply conductor 223 through the switch arm 225, switches 313 and 323, magnet 316, contact fingers 340 and 341, which are bridged by the contact segment 335, contact fingers 365, which are bridged by the contact members 363, contact members 293 and 292, coil 226, and the switch arm 224 to the supply conductor 222. It will be noted the cam blocks 42 must be in the unclamping position in order to bridge the contact fingers 365 by the contact members 363. It will also be noted that the relay 214 must be in released position in order to effect any control of the feed motor 22 by the pendent switch.

The operation of the clamp switch 366 for controlling the clamp motor 23 is similar to the operation of the clamp switch shown in Fig. 5 and accordingly it is deemed unnecessary to trace the circuits which are completed through the clamp switch 366. The relay 214 can only be operated when the cam nuts 42 are in a clamping position. This is evident inasmuch as the circuit for the coil 215 of the relay 14 extends through the contact members 364. In the clamping position of the machine, the contact fingers 364 are bridged by the contact members 363.

Modifications in the systems and in the arrangement and location of parts may be made within the spirit and scope of our invention and such modifications are intended to be covered by the appended claims.

What we claim is:

1. In a control system for automatically feeding and clamping a tool support for a machine tool, the combination with a reciprocating member, a main motor for operating the reciprocating member, a cutting tool, and a feed motor for feeding and for traversing the cutting tool, of means for operating the feed motor in accordance with the operation of the reciprocating member, means comprising a motor for clamping the tool in a set position, and means for operating the clamp motor prior to each feeding movement and immediately after each feeding movement.

2. In a control system for automatically feeding and clamping a tool support for a machine tool, the combination with a reciprocating member, a main motor for operating the reciprocating member, a cutting tool, and a feed motor for feeding and for traversing the cutting tool, of means for operating the feed motor in accordance with the operation of the reciprocating member, means comprising a motor for clamping the tool in position, and means for operating the clamp motor in one direction prior to each feeding movement and for operating the clamp motor in a reverse direction after each feeding movement.

3. In a control system for automatically feeding and clamping a tool support for a machine tool, the combination with a reciprocating member, a cross rail, tool supports for carrying cutting tools on the rail above the reciprocating member, a main motor for operating the reciprocating member, and a feed motor for feeding and traversing the tool supports on the rail, of means for operating said feed motor in accordance with the movement of the reciprocating member, a motor for clamping the supports on the rail, and means for operating the clamp motor prior to each feeding movement and immediately after each feeding movement.

4. In a control system for automatically feeding and clamping a tool support for a machine tool, the combination with a reciprocating member, a cross rail, tool supports for carrying cutting tools on the rail above the reciprocating member, a main motor for operating the reciprocating member, and a feed motor for feeding and traversing the tool supports on the rail, of means comprising a pilot switch for operating the main motor and the feed motor in accordance with the movement of the reciprocating member, a clamp motor, means operated by the clamp motor for clamping and unclamping the supports on the rail, and means for automatically operating the clamp motor prior to and after each feeding movement.

5. In a control system for a machine tool, the combination with a reciprocating member, a cross rail, tool supports mounted on the rail adjacent to the reciprocating member, each of said supports having a clapper member for carrying a cutting tool, a main motor for operating the reciprocating member, and a feed motor for feeding and traversing the tool supports on the rail, of means comprising a pilot switch for operating the main motor and the feed motor in accordance with the movement of the reciprocating member, a clamp motor, means operated by the clamp motor for clamping and unclamping the tool supports on the rail, for clamping and unclamping said clappers, and for operating the clappers to raise the cutting tools at the end of each cutting stroke and to lower the cutting tools at the end of each return stroke, and means for automatically operating the clamp motor before and after each feeding movement.

6. In a control system for a machine tool, the combination with a reciprocating member, a cross rail, saddles mounted on the rail adjacent to the reciprocating member, a slide mounted on each saddle, a clapper member mounted on each slide for carrying a cutting tool, a main motor for operating the reciprocating member, and a feed motor for feeding and for traversing the saddles on the rail, of means comprising a pilot switch for operating the main motor and the feed motor in accordance with the movement of the reciprocating member, a clamp motor, means operated by the clamp motor for clamping and unclamping the saddles on the rail, for clamping and unclamping said slides, for clamping and unclamping said clappers, and for operating the clappers to raise the cutting tools at the end of each cutting stroke and to lower the cutting tools at the end of each return stroke, and means for automatically operating the clamp motor before and after each feeding movement.

7. In a control system for a machine tool, the combination with a reciprocating member, a cross rail, tool supports mounted on the rail above the reciprocating member, said supports having clapper members for supporting the cutting tools, a main motor for operating the reciprocating member, and a feed motor for feeding and traversing the tool supports on the rail, of a pilot switch for operating the main motor and the feed motor in accordance with the movement of the reciprocating member, a clamp motor, and means operated by the clamp motor for clamping and unclamping the tool supports on the rail and for clamping and unclamping the said clapper members in accordance with the feeding movements.

8. In a control system for a machine tool, the combination with a reciprocating member, a cross rail, tool supports mounted on the rail above the reciprocating member, said supports having clapper members for supporting the cutting tools, a main motor for operating the reciprocating member, and a feed motor for feeding and traversing the tool supports on the rail, of a pilot switch for operating the main motor and the feed motor in accordance with the movement of the reciprocating member, a clamp motor, and means operated by the clamp motor for unclamping the clapper members and raising the tools at one end of the stroke of the reciprocating member and for lowering the tools and clamping the clapper members at the opposite end of the stroke of the reciprocating member.

9. In a control system for a machine tool, the combination with a reciprocating member, a cross rail, tool supports mounted on the rail above the reciprocating member, said tool supports having clapper members for supporting the cutting tools, a main motor for operating the reciprocating member, and a feed motor for feeding and traversing the tool supports on the rail, of a pilot switch for operating the main motor and the feed motor in accordance with the movement of the reciprocating member, a clamp motor, means operated by the clamp motor for unclamping the clapper members and raising the tools at one end of the stroke of the reciprocating member and for lowering the tools and clamping the clapper members at the opposite end of the stroke of the reciprocating member, and means operated by the clamp motor for clamping the tool supports in accordance with the movement of the reciprocating member.

10. In a control system for a machine tool, the combination with a reciprocating table, a cross rail, saddles mounted on the rail above the table, a main motor for operating the table, a clamp motor, and a feed motor for feeding and traversing the saddles on the rail, of a pilot switch for automatically operating the main motor and the feed motor in accordance with the operation of the table, clapper members for supporting the cutting tools, tool slides for supporting the clappers on said saddles, and means operated by the clamp motor for clamping the saddles to the rail, the slides to the saddles, and the clappers to the saddles after each feeding movement and for unclamping the saddles, the slides and the clappers before each feeding movement.

11. In a control system for a machine tool, the combination with a reciprocating table, a cross rail, saddles mounted on the rail above the table, a main motor for operating the table, and a feed motor for feeding and traversing the saddles on the rail, of a pilot switch for automatically operating the main motor and the feed motor in accordance with the operation of the table, clapper members for supporting the cutting tools, tool slides for supporting the clappers on said saddles, a clamp motor, and means operated by the clamp motor for locking the saddles to the rail, the slides to the saddles and the clappers to the slides after each feeding movement and for unclamping the saddles, the slides and the clappers before each feeding movement, said means also serving to operate the clapper members to separate the tools from the work at one end of the table movement and to move the tool into engagement with the work at the other end of the table movement.

12. In a control system for a machine tool, the combination with a reciprocating table, a cutting tool mounted adjacent to said table, a feed motor for feeding and for traversing the tool, and a main motor for operating the reciprocating member, of an auxiliary motor, and means for automatically operating said auxiliary motor to move the tool away from the work at one end of the stroke of the reciprocating member, to move the tool toward the work at the other end of the stroke of the reciprocating member, and to clamp the tool against movement when the reciprocating member is moving in one direction.

13. In a control system for a machine tool, the combination with a reciprocating table, a cutting tool for engaging the work carried by the table, a main motor for operating the reciprocating table, and a pilot switch operated by the reciprocating member for controlling the main motor, of an auxiliary motor controlled by the pilot switch, means operated by the auxiliary motor for separating the cutting tool from the work at one end of the stroke of the table and for moving the tool into engagement with the work at the other end of the table stroke, and means for clamping the tool when moved into position to engage the work at one end of the table stroke.

14. In a control system for a machine tool, the combination with a reciprocating table, a cutting tool for engaging the work carried by the table, a main motor for operating the reciprocating member, a feed motor for feeding the cutting tool, and a pilot switch for operating the feed motor and main motor in accordance with the movement of the table, of an auxiliary motor controlled by the pilot switch, means operated by the auxiliary motor for separating the cutting tool from the work at one end of the table stroke and for moving the tool into operative relation to the work at the other end of the table stroke, and means for clamping the tool when moved into position to engage the work at one end of the table stroke.

15. In a control system for a machine tool, the combination with a reciprocating table, a main motor for operating the table, a cutting tool for engaging the work carried by the table, and means for effecting feeding movement by the tool in accordance with the table movements, of a pilot switch for operating the main motor in accordance with the table movements, a clamp motor, and a sequence switch controlled by the pilot switch for operating the clamp motor prior to and subsequent to each feeding movement.

16. In a control system for a machine tool, the combination with a reciprocating table, a main motor for operating the table, a cutting tool for engaging the work carried by the table, and a feed motor for effecting feeding and traversing movements by the cutting tool, of a pilot switch for operating the main and the feed motor in accordance with the movement of the table, a clamp motor, and a sequence switch controlled by the pilot switch for operating the feed motor and for operating the clamp motor prior to and subsequent to the operation of the feed motor.

17. In a control system for a machine tool, the combination with a reciprocating table, a main motor for operating the table, a cutting tool for engaging the work carried by the table, and means for effecting feeding movement by the tool in accordance with the table movements, of a pilot switch operated by the table for controlling the main motor, a clamp motor, and a sequence switch controlled by the pilot switch for controlling the feeding movements and for operating the clamp motor prior to and subsequent to each feeding movement.

18. In a control system for a machine tool, the combination with a reciprocating table, a main motor for operating the table, a cutting tool for engaging the work carried by the table, and a feed motor for effecting feeding and traversing movements by the tool, of a pilot switch operated by the table for controlling the main motor, a clamp motor, and a sequence switch controlled by the pilot switch for operating the feed motor to effect feeding movements and for operating the clamp motor prior to and subsequent to each feeding movement.

19. In a control system for a machine tool, the combination with a reciprocating table, a cutting tool for engaging the work carried by the table, and a feed motor for feeding and traversing the tool, of a pilot switch operated by the table for controlling the main and the feed motor, a clamping motor for moving the tool out of operative relation to the work at one end of the table stroke, and a sequence switch operated by the pilot switch for effecting feeding movements by the feed motor and for rotating the clamp motor in different directions at opposite ends of the table stroke.

20. In a control system for a machine tool, the combination with a reciprocating table, a cutting tool for engaging the work carried by the table, and a feed motor for feeding and traversing the tool, of a pilot switch operated by the table for controlling the main and the feed motors, a clamping motor, and a sequence switch operated by the pilot switch at each end of the table stroke, said sequence switch effecting rotation of the clamp motor in one direction at one end of the table stroke and effecting rotation of the clamp motor in a reverse direction at the opposite end of the table stroke.

21. In a control system for a machine tool, the combination with a reciprocating table, a cutting tool, and a feed motor for effecting feeding and traversing movements of the cutting tool, of a pilot switch operated by the table for controlling the main motor, a clamp motor, a sequence switch operated by the pilot switch for automatically controlling the feed and the clamp motor in accordance with the table movements, and an auxiliary switch for controlling the clamping motor at will, said auxiliary switch in one position serving to prevent automatic operation of the feed and clamp motor.

22. In a control system for a machine tool, the combination with a reciprocating table, a cutting tool, and a feed motor for effecting feeding and traversing movements of the cutting tool, of a pilot switch operated by the table for controlling the main motor, a clamp motor, a sequence switch operated by the pilot switch for automatically controlling the feed and the clamp motor in accordance with the table movements, an auxiliary switch for controlling the clamping motor at will and for preventing the automatic operation of the feed and clamp motors in one position thereof, and means for preventing the automatic operation of the feed and clamp motor until the auxiliary switch has been moved to the clamping position and then the off position.

23. In a control system for a machine tool, the combination with a reciprocating table, a cutting tool, and a feed motor, of a pilot motor operated by the table for controlling the main motor, a clamp motor, a sequence switch operated by the pilot switch for automatically controlling the feed motor and the clamp motor in accordance with the table movements, means for traversing the feed motor independent of the sequence switch, means comprising a clamp switch for operating the clamp motor at will and independent of the sequence switch, said clamp switch also serving in the clamp position to prevent automatic operation of the feed and the clamp motors by the sequence switch, and means for preventing the automatic operation of the clamp motor by the sequence switch until the clamp switch has been moved through predetermined positions.

24. In a control system for a machine tool, the combination with a reciprocating table, a cutting tool, and a feed motor, of a pilot motor operated by the table for controlling the main motor, a clamp motor, a sequence switch operated by the pilot switch for automatically controlling the feed and the clamp motors in accordance with the table movements, means for traversing the feed motor independent of the sequence switch, means comprising a clamp switch for operating the clamp motor at will and independent of the sequence switch, said clamp switch also serving in the clamp position to prevent automatic operation of the feed and clamp motors by the sequence switch, and means comprising a relay controlled by the clamping switch for controlling the automatic operation of the feed and clamp motors by the sequence switch.

25. In a control system for a machine tool, the combination with a reciprocating table, a cutting tool, and a feed motor, of a pilot motor operated by the table for controlling the main motor, a clamp motor, a sequence switch operated by the pilot switch for automatically controlling the feed and the clamp motors in accordance with the table movements, means for traversing the feed motor independent of the sequence switch, means comprising a clamp switch for operating the clamp motor at will independent of the sequence switch and for preventing automatic operation of the feed and clamp motor by the sequence switch, a relay operated only when the clamp switch is in the clamped position, and a holding circuit for said relay controlled by the sequence switch when the clamp switch is in the off position.

In testimony whereof, we hereto affix our signatures.

ROBERT C. DEALE.
ROSWELL H. RAUSCH.